United States Patent
Schnell

(10) Patent No.: US 9,858,237 B2
(45) Date of Patent: Jan. 2, 2018

(54) INFORMATION HANDLING SYSTEM DIFFERENTIAL SIGNALLING VARIABLE BANDWIDTH INTERFACE SELECTIVELY CONFIGURING SINGLE ENDED AND DIFFERENTIAL SIGNALS

(71) Applicant: Dell Products L.P., Round Rock, TX (US)

(72) Inventor: Arnold T. Schnell, Hutto, TX (US)

(73) Assignee: DELL PRODUCTS L.P., Round Rock, TX (US)

(*) Notice: Subject to any disclaimer, the term of this patent is extended or adjusted under 35 U.S.C. 154(b) by 297 days.

(21) Appl. No.: 14/708,420

(22) Filed: May 11, 2015

(65) Prior Publication Data
US 2016/0335222 A1    Nov. 17, 2016

(51) Int. Cl.
*H05K 7/10* (2006.01)
*G06F 13/42* (2006.01)
*G06F 13/38* (2006.01)

(52) U.S. Cl.
CPC ........ *G06F 13/4286* (2013.01); *G06F 13/385* (2013.01)

(58) Field of Classification Search
USPC ................... 710/104–110, 300–313
See application file for complete search history.

(56) References Cited

U.S. PATENT DOCUMENTS

| | | | | |
|---|---|---|---|---|
| 8,041,873 B2 * | 10/2011 | Chu | ............................ | G06F 1/12 709/227 |
| 2012/0117294 A1 * | 5/2012 | Jadus | .................... | G06F 13/4004 710/315 |
| 2015/0331826 A1 * | 11/2015 | Ghosh | .................. | G06F 13/4022 710/313 |
| 2015/0363350 A1 * | 12/2015 | Yeung | .................. | G06F 13/4221 710/106 |

OTHER PUBLICATIONS

Wikipedia, USB Type-C, printed Jan. 28, 2016.

* cited by examiner

*Primary Examiner* — Raymond Phan
(74) *Attorney, Agent, or Firm* — Terrile, Cannatti, Chambers & Holland, LLP; Robert W. Holland

(57) ABSTRACT

An information handling system port selectively communicates differential and single-ended signals from port pins to a cable coupled with the port so that bandwidth of information sent through the port increases if a cable accepts single-ended signals. Single-ended signals sent from the port pins are provided to a redriver of the cable to generate differential signals on wireline pairs of the cable. The redriven single-ended signals effectively double the bandwidth from reconfigured differential pairs of a port without increasing the port footprint or altering the port from a standard form factor, such as a Type-C USB form factor.

20 Claims, 7 Drawing Sheets

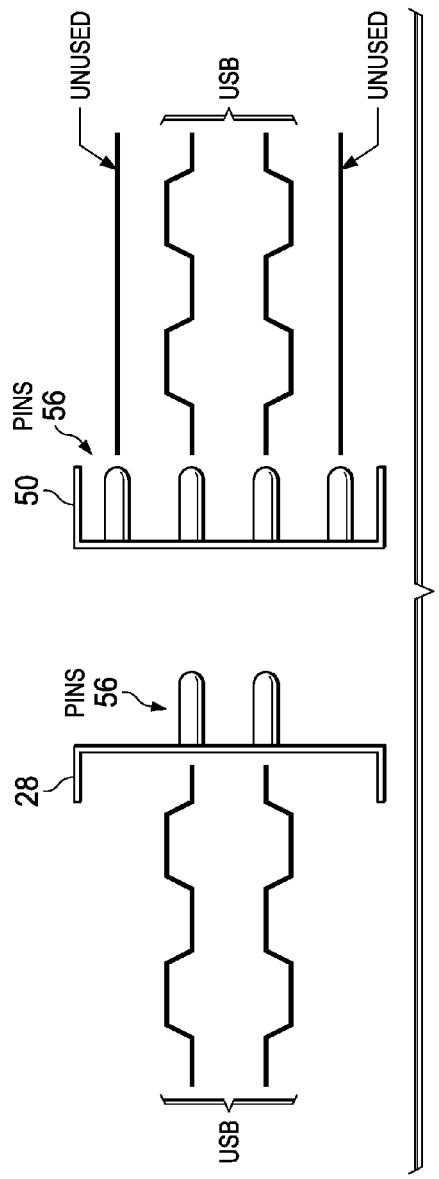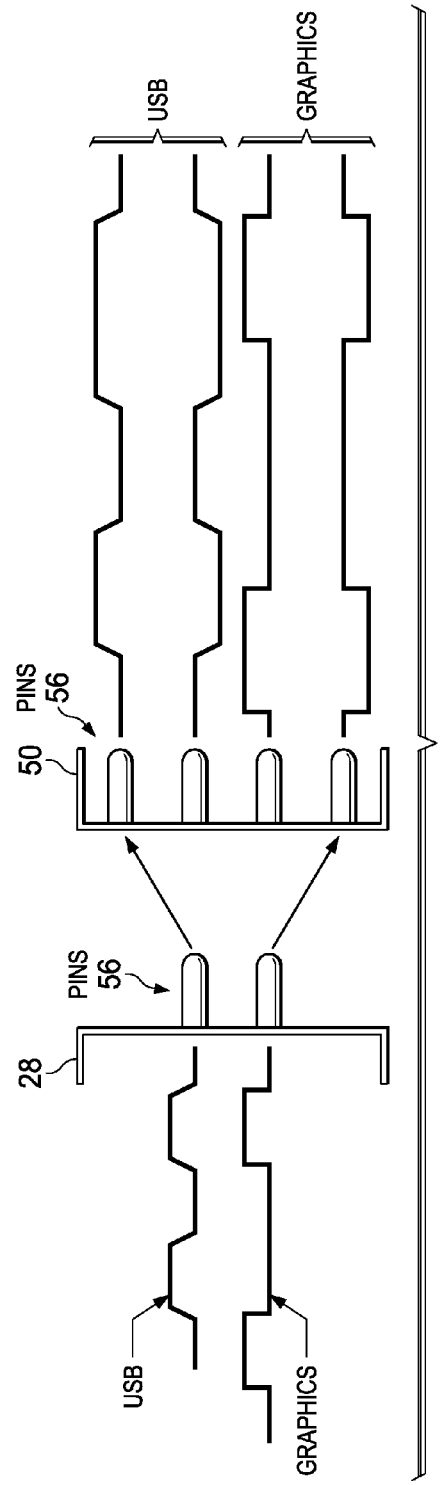

INFORMATION HANDLING SYSTEM DIFFERENTIAL SIGNALLING VARIABLE BANDWIDTH INTERFACE SELECTIVELY CONFIGURING SINGLE ENDED AND DIFFERENTIAL SIGNALS

BACKGROUND OF THE INVENTION

Field of the Invention

The present invention relates in general to the field of information handling system information communication, and more particularly to an information handling system differential signaling variable bandwidth interface.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems communicate information with external devices and networks to provide a number of different functionalities. For example, information handling systems send graphics information to displays to present visual images, to speakers to play audible noise, to human interfaces devices (HID) to accept inputs to keys or pointing inputs, and to network interfaces to communicate with networks. Although wireless interfaces support many such communications, wired communications tend to have greater security and speed. Wired interfaces typically couple with information handling systems through standardized ports, such as Universal Serial Bus (USB), Ethernet, HDMI, DisplayPort and other types of ports defined by various standards bodies. By limiting the number of different types of ports and cable connectors to a set of well-defined standards, information handling system manufacturers provide greater convenience to end users.

USB in particular has gained popularity as a standardized serial interface for information handling systems. USB generally supports HID devices that plug into an information handling system cable, such as keyboards or mice. Many peripheral devices include USB interfaces to allow flexibility in interactions with information handling systems. Examples include external storage devices, cameras, smartphones, tablets, printers, displays, docking stations, etc. Although conventional USB provides good bandwidth for data communications through serial interfaces and differential signaling, functions that use high rates of communications are often limited when performed over USB. For example, USB will support a cable interface with a display device, however, the display quality may suffer at higher resolutions due to limitations in bandwidth relative to display-specific ports and cables, such as DisplayPort.

In part to address the need for higher bandwidth through a standardized serial interface, industry has introduced USB 3.0 with an increased bandwidth provided by 8 pins supporting 4 differential signaling pairs. USB 3.0 not only increases data transfer rates but also increases power transfer rates with a new connector and port configuration known as the Type C connector. To help drive adoption of USB 3.0 and the Type C connector, the USB standards body allows the use of "guest" protocols on the 4 differential signaling pairs. The standard includes provisions for communication and configuration of the 8 pin interface such that the host and supported device can find a mutually acceptable communication channel. Thus, rather than "tunneling" display pixel data through a USB interface, two of the differential pairs may be configured as DisplayPort pairs to support "2 k" resolution display devices or four of the differential pairs may be configured as DisplayPort pairs to support high resolution "4 k" display devices. By allowing flexible use of differential pairs for different types of protocols, the USB standards body provides a common cable configuration that adapts to different types of functions. Nonetheless, the bandwidth at the USB 3.0 Type C connector is constrained by the definition of 8 pins that support 4 differential pairs.

SUMMARY OF THE INVENTION

Therefore, a need has arisen for a system and method which provides information handling system differential signaling with variable bandwidth interface configurations.

In accordance with the present invention, a system and method are provided which substantially reduce the disadvantages and problems associated with previous methods and systems for sending information from an information handling system port as differential signals. A set of first and second port pins configured to send information as a single differential signal is selectively reconfigured to instead send first single ended signals at the first pin and second single ended signals at the second pin. A cable that accepts the single-ended signals from the first and second pins generates differential signals for the single-ended signals and transmits the differential signals through additional wirelines disposed in the cable.

More specifically, an information handling system generates information with an operating system and applications running instructions stored in memory on a processor. A port disposed in a housing of the information handling system includes plural pins that communicate information to a cable having plural wirelines that interface with the plural pins. A communications controller, such as a USB controller or graphics controller included in a chipset of the information handling system sends information from the port to a cable in a first configuration having each of plural sets of pins communicate a differential signaling. For example, eight pins of a standard USB 3.0 Type C connector port are configured to send information as four differential signaling pairs, such as to conform with the USB standard. The communications controller selectively reconfigures one or more sets of differential signaling pairs to instead have each pin of a differential signaling pair instead send a single-ended signal to the cable connector. Within the cable, a redriver accepts the single-ended signals and redrives each single-ended signal to a pair of wirelines as a differential signal across the pair of wirelines. For example, the communications controller detects that an attached cable has the redriver capability or is directed to reconfigure signals as single-ended to one or more pin sets by the device on the opposite end of the cable as part of the USB configuration process.

The present invention provides a number of important technical advantages. One example of an important technical advantage is that a standard USB Type C connector on an information handling system has substantially double the bandwidth by connecting a cable that adds wirelines and differential signaling. With double the bandwidth, a Type-C port provides a docking station capability with minimal footprint consumed at the housing by providing dual functionality: USB with standard differential signaling, and USB plus high resolution graphics with single-ended signaling at port pins translated to differential signaling in a docking station cable. In the high bandwidth mode, two sets of differential pin pairs may be used for standard USB signaling while the other two sets of differential pairs may convert into four single-ended pins for other functions, such as to feed four DisplayPort PCIExpress (or other serial interface that uses differential signaling) signals to a cable that translates the signals to differential signals for communication over the cable. Alternatively, all four sets of differential pin pairs may convert into eight single-ended pins to achieve greater data throughput when a matching cable is attached. Dual purpose of the Type-C or other differential signaling port reduces information handling system size and complexity, and allows variable bandwidth communication through a port and cable connection based on the type of cable available to an end user and automated configuration.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 2A-2B (generally referred to as FIG. 2) depict a set of two differential signaling pins configured to send a single differential signal and reconfigurable to send information as two single-ended signals;

DETAILED DESCRIPTION

An information handling system selectively configures pins of a communications port to send single-ended and differential signals based upon the type of cable interfaced with the port. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
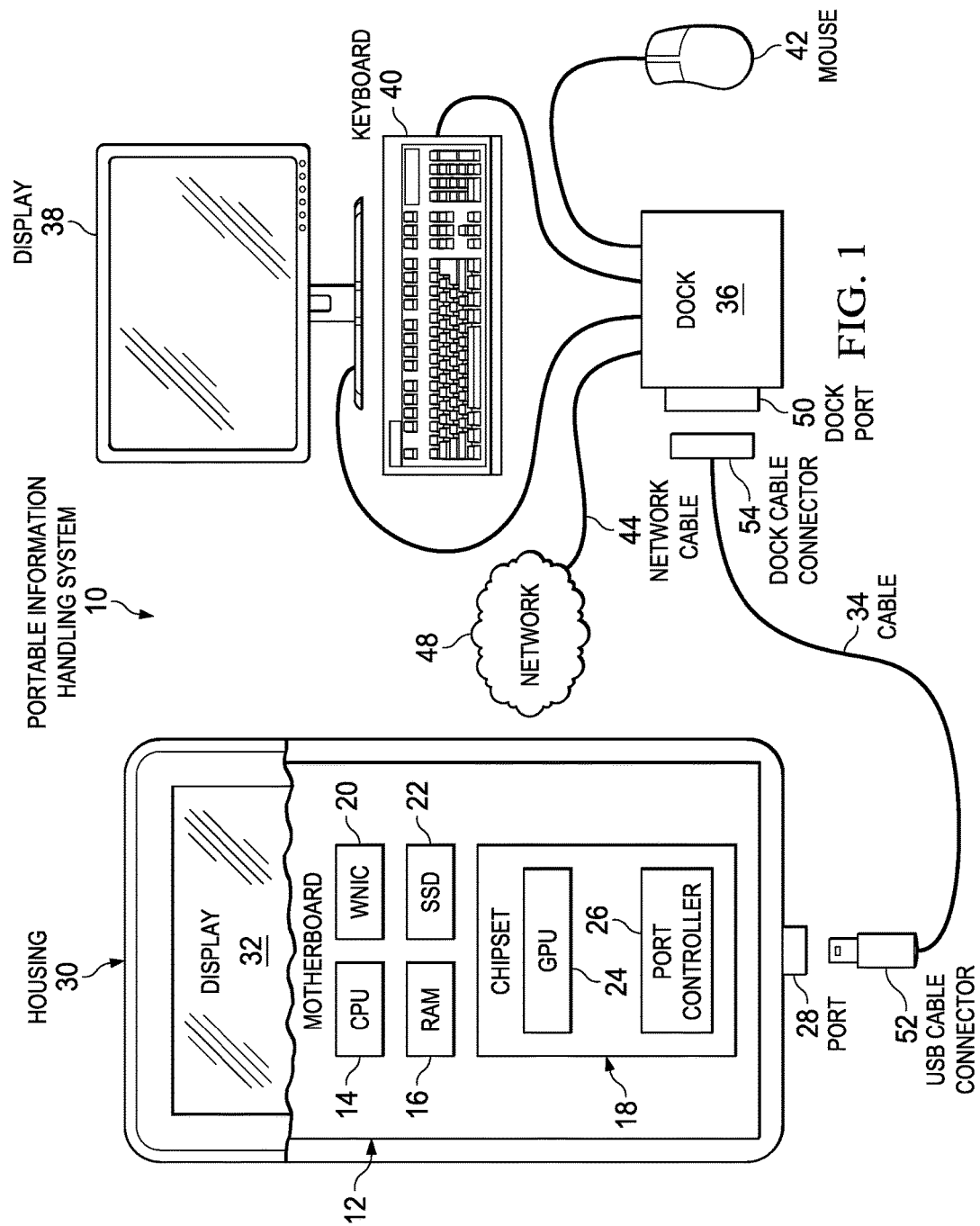
FIG. 1 depicts a portable information handling system configurable to communicate information through a cable as differential and single-ended signals.

Referring now to FIG. 1, a portable information handling system 10 is configurable to communicate information through a cable as differential and single-ended signals. Information handling system 10 processes information with components disposed on motherboard 12. For example, an operating system and application execute as instructions on a central processing unit (CPU) 14 interfaced with a random access memory (RAM) 16. A chipset 18 interfaced with CPU 14 and RAM 16 includes processing components that execute firmware, such as controllers that execute option ROMs, to coordinate end user interactions with the operating system and application. As some examples, chipset 18 coordinates communications with wireless networks through a wireless network interface card (WNIC) 20. As another example, chipset 18 coordinates retrieval and storage of information in persistent memory, such as a solid state drive (SSD) 22. Chipset 18 is depicted with a graphical processor unit (GPU) 24 that converts information into pixel values for presentation at a display. A port controller 26 of chipset 18 manages communication of information through a port 28 that couples to external devices, such as with Universal Serial Bus (USB) or other types of communication protocols. Motherboard 12 is held securely in a planar housing 30 having a tablet configuration with a display 32 disposed on an upper exposed surface. GPU 24 presents information as visual images on display 32 by converting visual information into pixel values. Although depicted as a tablet configuration, information handling system 10 may take other forms, such as laptop, convertible, smartphone or desktop configurations.

Port controller 26 coordinates with external devices to communicate information through port 28. For example, port controller 26 is a USB 3.0 communications controller that uses eight pins to communicate as four differential pairs and also establishes power and ground interfaces. In the example embodiment, a cable 34 transfers signals between information handling system 10 and dock 36 to support peripheral devices in a desktop environment, such as a peripheral display 38, a keyboard 40, a mouse 42, and a network cable 44 interfaced with a network 48. Dock 36 includes a dock port 50 that couples that may or may not have the same configuration as port 28. Cable 34 includes a USB cable connector 52 that couples to port 28 and a dock cable connector 54 that couples to dock port 50. Cable connectors 52 and 54 may or may not have the same configuration, as is set forth in greater depth below. In order to increase the bandwidth available for communication through port 28, port controller 26 configures pins of port 28 to receive a single-ended signal at one or more individual pins instead of a differential signal at a set of two pins. Using pins of port 28 for sending single-ended signals allows each pin of a differential pair set of pins to communicate its own data, effectively doubling the bandwidth of a set of pins. In order to maintain signal integrity in the face of noise, cable connector 52 or dock 36 creates a differential signal in extra wirelines of cable 34 as set forth in greater detail below.

Use of single-ended signaling in place of differential signaling is allowable when the advantages of differential signaling are not needed. Differential signaling offers noise immunity, as the common mode noise is easily eliminated by the differential receiver. When the information handling system places the IO controller near the IO connector, there is often minimal need for noise immunity. Secondly, differential signaling is often used in cabling to manage ground bounce, a phenomena caused when the two connected systems have somewhat independent signal grounding. When a signal traverses through a connector to a receiver within the cable, the cable can be designed to ensure a common ground exists between the information handling system and the receiver in the cable, thus eliminating ground bounce. Third, differential signaling is often used in cabling to achieve greater distances between connected information handling systems. When great distance is not needed, such as the case when a signal traverses from the system to a receiver in an attached cable, then single-ended signaling is sufficient. When all of the advantages of differential signaling are not necessary, an opportunity to increase data throughput exists by using single-ended signaling.

Referring now to FIG. 2, a set of two differential signaling pins 56 is depicted configured to send a single differential signal and reconfigurable to send information as two single-ended signals. In FIG. 2A, a differential signal of USB communications is sent to first and second pins 56 of a port 28 in a conventional manner with opposing peak values offsetting noise as convention differential signaling is designed to do. The USB differential signal is provided to first and second pins 56 of connector 50 to communicate through cable 34 across two wirelines in a conventional manner. Cable 34 includes two unused wirelines that do not carry any signals in FIG. 2A. In FIG. 2B, however, a USB single-ended signal is sent to a first pin of port 28 and a graphics single-ended signal is sent to a second pin of port 28. The first and second pins 56 communicate the first and second single-ended signals to connector 50 where the single-ended signals are transferred to wirelines as with FIG. 2A. In order to maintain good signal integrity through cable 34, the unused wirelines are employed to in FIG. 2B to carry a differential signal having opposed peak currents of the single-ended signals and generated external to port 28. The differential signals are added to match the single-ended signals so that the opposite end of cable 34 will receive a differential signal.

Although the example embodiment of FIG. 2 depicts reconfiguration of a first and second pin of one set of a differential pair of pins, in alternative embodiments, alternative types of protocols and physical configurations for connectors may reconfigure one or more sets of differential signaling pin pairs to send single-ended signals supported by wirelines disposed in a connection cable. Also, use of reserved pins, such as Type-C SBU pins, to pass additional data as set forth herein is possible. Using USB 3.0 as an example with eight pins configured as four pairs communicating through a Type-C connector and port, "guest" protocols may be driven as single-ended signals on one or more of a pair of pins to add bandwidth as needed for supporting graphics, docking or other functions. More specifically, USB has bi-directional data flow through eight pins defined as four differential pairs that, under the USB 3.0 standard, may be reconfigured to use four pins as two differential pairs to send USB data and four pins as two differential pairs to send DisplayPort data. When information handling system 10's communications controller 26 detects or is told as part of the configuration handshake that extra wirelines are available in a connecting cable 34, then communications controller 26 configures one or more sets of pins so that each pin in a set sends individually its own single-ended signal that is match in cable 34 to double the bandwidth of information that is sent through the set of pins. The single-ended signals exist only for a short length, such as through the pin and a MUX of the cable connector 50 where a redriver or an inverse amplifier repeats an inverse of the single-ended signal to create a differential signal. Over that short length, crosstalk and jitter due to single-ended signals is minimal. In this manner, noise immunity, ground bounce and signal amplitude for long cable distances are effectively managed with the transmission of the single-ended signals.

Figure 3:
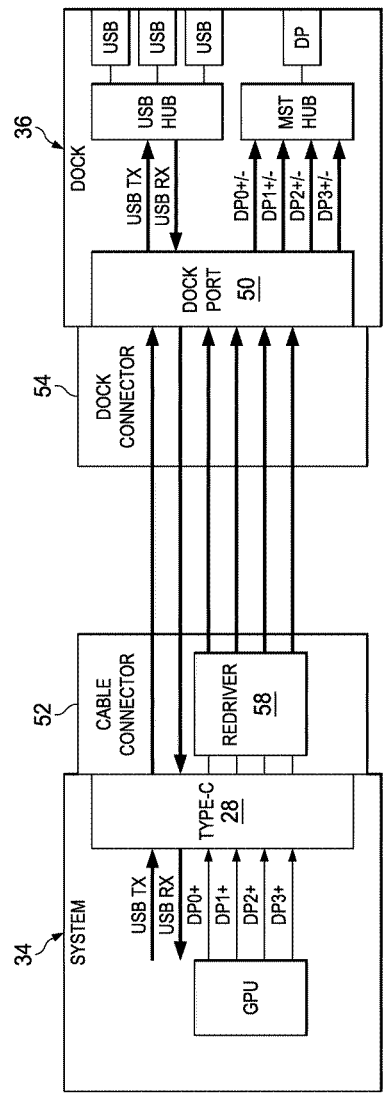
FIG. 3 depicts a circuit block diagram of an information handling system sending single-ended signals to a cable for communication to a docking station as differential signals.

Referring now to FIG. 3, a circuit block diagram depicts an information handling system 10 sending single-ended signals to a cable 34 for communication to a docking station 36 as differential signals. Information handling system 10 includes a GPU 24 that generates pixel information at four DisplayPort lanes DP 0-3. Although the Type-C port 28 of information handling system 10 only includes 8 data pins for communicating 4 differential signals through 4 sets of 2 pins each, a redriver 58 disposed in cable connector 52 (sometimes referred to as a "paddleboard" portion of the cable) accepts the DisplayPort information as single-ended signals at four individual pins and generates differential signals at extra wirelines disposed in the cable 34. Thus, the eight individual data pins have the bandwidth of 12 pins so that USB and full DisplayPort capability are provided from the Type-C USB port. Dock 36 in the example embodiment accepts differential signals at 12 pins with a non-standard connector adapted to dock 36. The differential signals from the DisplayPort pins are provided to an MST hub and DisplayPort sink, and the USB differential signals are provided to a USB hub.

In the example embodiment, variable bandwidth of USB and DisplayPort signals are supported by increasing dock 36's pin count, redriving DisplayPort positive signals to generate negative signals for differential signaling provided within cable connector 52, and routing only the positive side of the DisplayPort lanes from GPU 24 to pins of port connector 28. Differential signals generated by redriver 58 eliminate common mode noise effectively since the single ended DisplayPort signals travel only a short distance. Further, redriver 58 does not share a common ground with dock 36 so that the isolated ground planes require differential signaling in the cable. Redriver 58 supports adequate signal amplitude over longer cable distances and resides proximate port 28 so that single-ended transmissions are kept small. Tolerances to ground offsets are maintained by referencing redriver 58 ground to the host system 28 so that ground bounce and signal loss are minimal.

Figure 4:
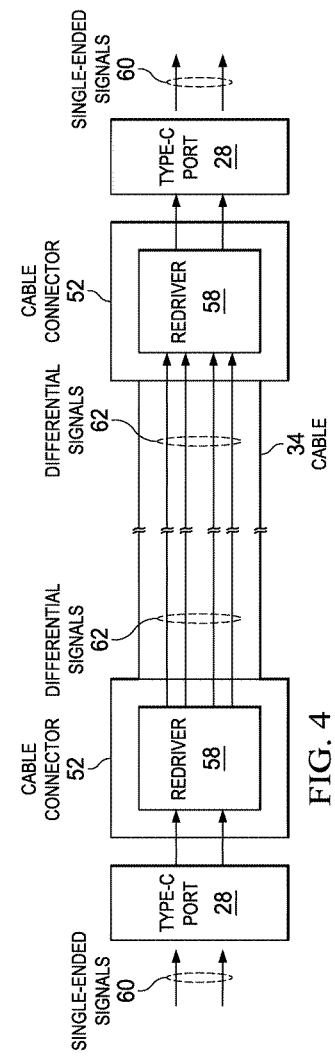
FIG. 4 depicts a circuit block diagram of single-ended signals sent and received between a source and target device with communication through a cable as differential signals.

Referring now to FIG. 4, a circuit block diagram depicts single-ended signals sent and received between a source and target device with communication through a cable 34 as differential signals. In the example embodiment, bi-directional communication is established with a single-ended signal 60 at individual pins of connectors 52 and ports 28 on opposing sides of cable 34. At each Type-C port 28, single-ended signals are sent and received at individual pins interfaced with cable connector 52. Within each cable connector 52, a redriver 58 accepts the single-ended signal from the individual pins and generates differential signals 62 for communication between each cable connector 52. When a differential signal 62 arrives on a pair of wirelines at a cable connector 52, one portion may simply be dropped to ground and the other forwarded to a port 28 as a single-ended signal 60. Alternatively, the differential signals arrive at redriver 58 to have one inverted and added to the other so that the combined signal is provided as a single-ended signal 60 at a target device. In the example embodiment, both ends of cable 34 terminate at a port 28 that has a reduced footprint with a reduced pin count as needed to support single-ended signaling since the translation for communication over dual wirelines as a differential signal takes place within cable 34.

Figure 5:
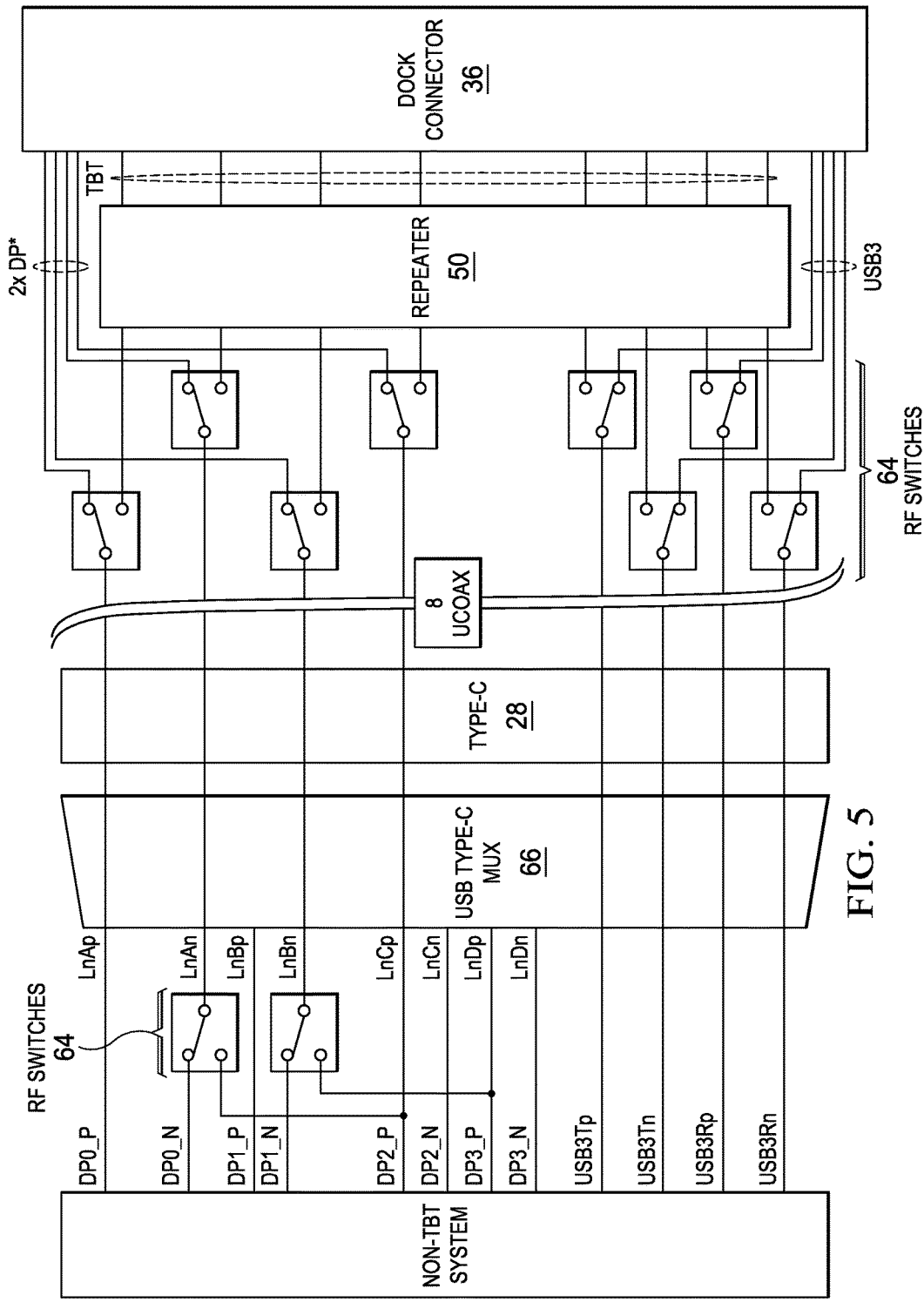
FIG. 5 depicts a circuit block diagram of one example embodiment of single-ended to differential signal translation between target and source devices.

Referring now to FIG. 5, a circuit block diagram depicts one example embodiment of single-ended to differential signal translation between target and source devices. In the example embodiment, eight wirelines communicate data through a cable 34, such as USB standard cable. The communications controller provides twelve data inputs to port 28 through a USB Type-C MUX device, such as TI HD3SS460 MUX. RF switches 64 select output from the controller to provide to port 28. In the example, RF switches 64 close to select DisplayPort lines DP0 and DP1 to send two differential signals through port 28 to a dock connector 50. DisplayPort lines DP2 and DP3 do not send data across cable 34. A differential set of USB transmit (USB3Tp and n) and a differential set of USB receive (USB3Rp and n) lanes are provided across cable 34. RF switches 64 disposed in cable 34 close to send the DisplayPort and USB differential signals to dock connector 50. In the event that communications controllers on an information handling system and dock configure to use single-ended signals, RF switches at each end of the communications path may arrange for single-ended DisplayPort signals to enter port 28, however, cable 34 will have to include extra wirelines and the ability to add a differential signal to the single-ended signals. Alternatively, USB pins may be configured to act as DisplayPort neutral pins so that all eight lines of cable 34 communicate DisplayPort differential signals. As depicted in FIG. 5, dock connector 50 includes a repeater 66 that supports the Intel Thunderbolt protocol, such as an Intel Alpine Ridge controller that receives a Thunderbolt input channel, recovers the clock and data, retimes the clock and data as it outputs the data. However, the information handling system depicted does not support the Thunderbolt protocol and instead uses USB.

Figure 6:
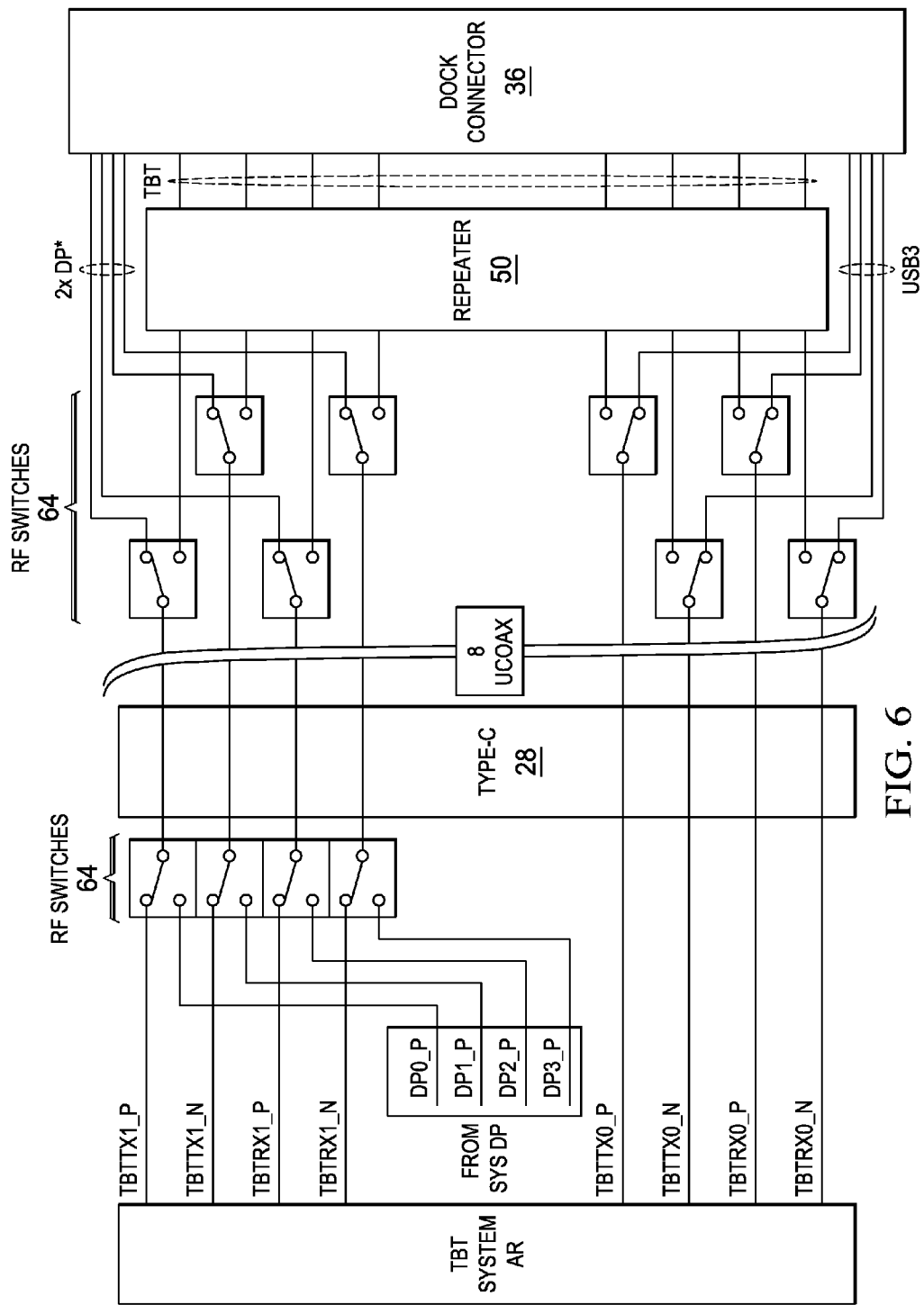
FIG. 6 depicts a circuit block diagram of another example embodiment of single-ended to differential signal translation between target and source devices.

Referring now to FIG. 6, a circuit block diagram depicts another example embodiment of single-ended to differential signal translation between target and source devices. The information handling system of the example embodiment of FIG. 6 supports the Thunderbolt protocol and elects with dock connector 50 to selectively configure either DisplayPort, USB or Thunderbolt. For example, RF switches 64 on each end of cable 34 close to configure all eight wirelines for communicating Thunderbolt protocol signals in cooperation with repeater 66. Alternatively, four single-ended signals DP0-3_P are provided from a GPU with differential signals provided by reconfigured Thunderbolt output or by a redriver in cable 34. Similarly, USB may be configured to use all eight wirelines of cable 34 or to share wirelines with DisplayPort. Although the information handling system and dock in the depicted example would likely select Thunderbolt to communicate at a more rapid data rate, having the ability to select pin output as single-ended or differential USB or DisplayPort signals provides flexibility for the end user to communicate with different target devices through a common USB Type-C connector.

Figure 7:
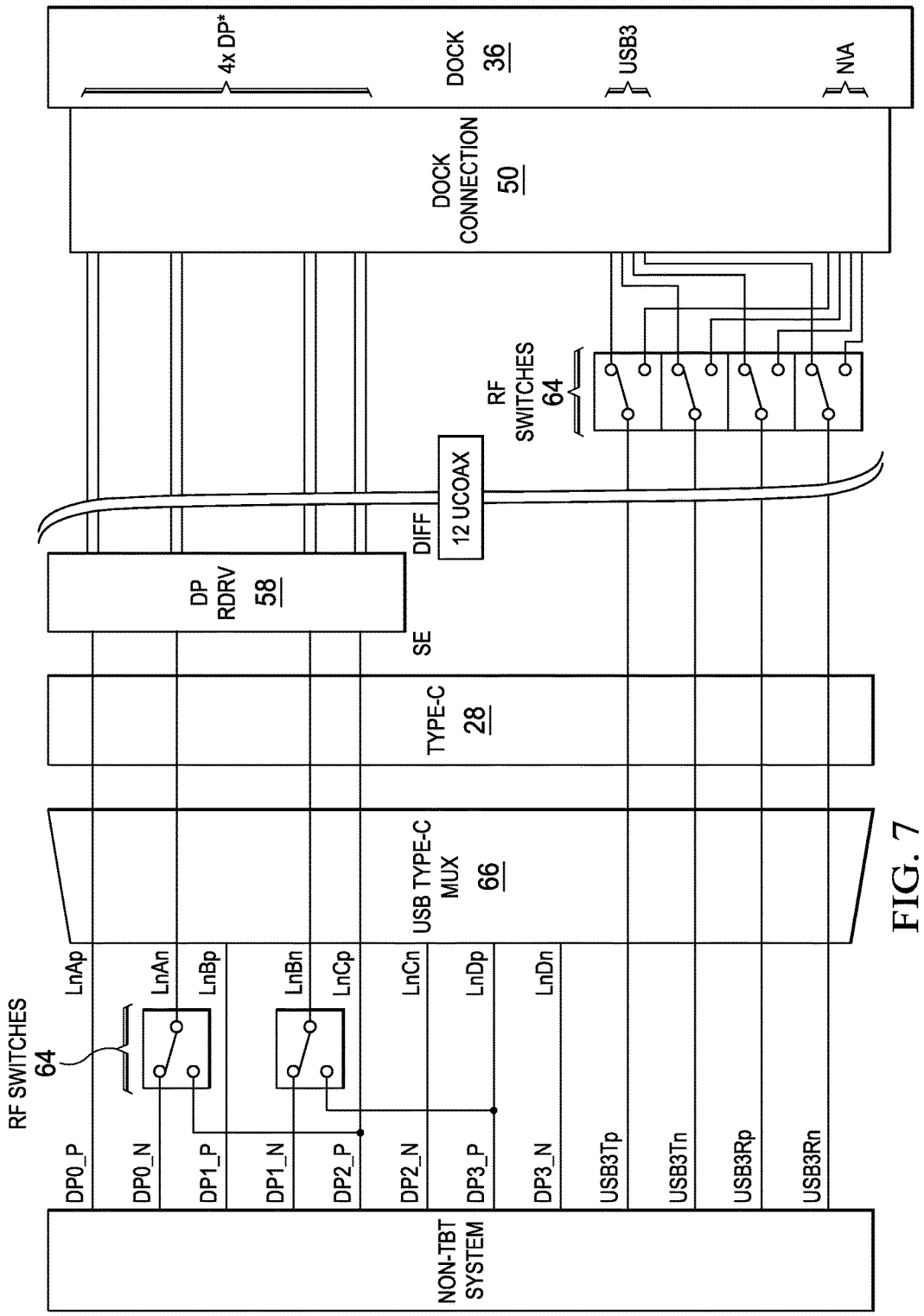
FIG. 7 depicts a circuit block diagram of another example embodiment of single-ended to differential signal translation between target and source devices.

Referring now to FIG. 7, a circuit block diagram depicts another example embodiment of single-ended to differential signal translation between target and source devices. In the example embodiment of FIG. 7, a twelve wireline cable 34 includes a redriver 58 that accepts single-ended signals from port 28 USB pins and creates differential signals with the four extra wirelines of cable 34 that are not connected to port 28. FIG. 7 corresponds to FIG. 5 as an information handling system that does not support the Thunderbolt protocol but that interacts with the twelve wireline cable 34 to use single-ended signals for variable bandwidth. For example, RF switches 64 close to send only DisplayPort positive signals P to port 28 so that redriver 58 creates neutral signals N to support differential signaling across cable 34. With four lanes of DisplayPort supported by four single-ended signals and redriver 58, four pins of port 28 are available to support two differential pairs of USB communication. RF switches 64 at dock connector 50 are configured to accept USB signals since Thunderbolt is not supported. If desired, the information handling system and dock communication controllers may also use two single-ended signals to send USB protocol information instead of DisplayPort information so that four differential signals of USB are sent across cable 34.

Figure 8:
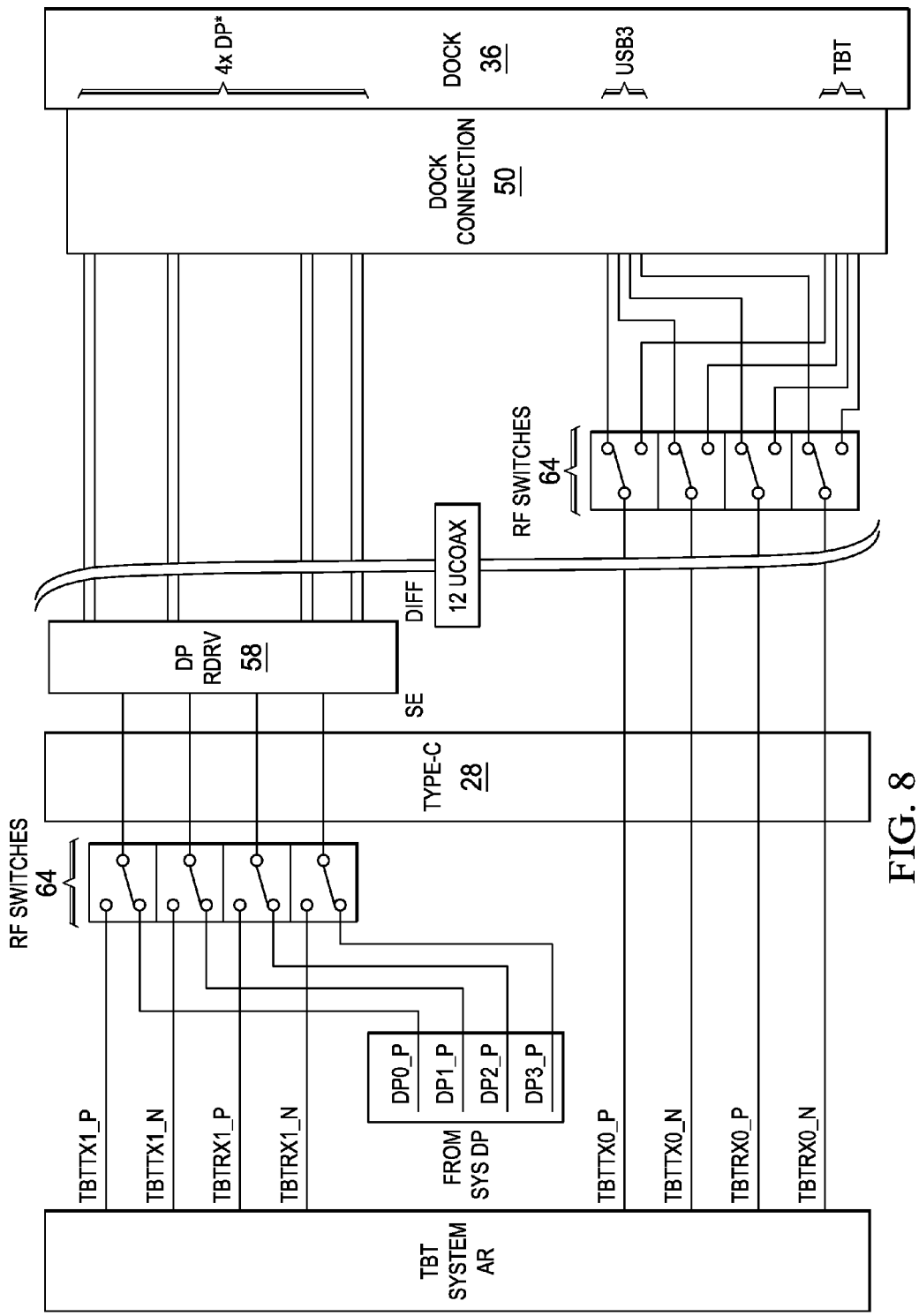
FIG. 8 depicts a circuit block diagram of another example embodiment of single-ended to differential signal translation between target and source devices.

Referring now to FIG. 8, a circuit block diagram depicts another example embodiment of single-ended to differential signal translation between target and source devices. In the example embodiment of FIG. 8, a twelve wireline cable 34 includes a redriver 58 that accepts single-ended signals from port 28 USB pins and creates differential signals with the four extra wirelines of cable 34 that are not connected to port 28. FIG. 8 corresponds to FIG. 6 as an information handling system that does support the Thunderbolt protocol but that interacts with the twelve wireline cable 34 to use single-ended signals for variable bandwidth. For example, RF switches 64 close to send only DisplayPort positive signals P to port 28 so that redriver 58 creates neutral signals N to support differential signaling of four DisplayPort lanes across cable 34. With four lanes of DisplayPort supported by four single-ended signals and redriver 58, four pins of port 28 are available to support two differential pairs of Thunderbolt communication. RF switches 64 at dock connector 50 are configured to accept Thunderbolt signals instead of USB signals since Thunderbolt provides greater communications bandwidth. If desired, the information handling system and dock communication controllers may also use two single-ended signals to send various combinations of USB, Thunderbolt and DisplayPort protocol information by configuring port 28 pins to accept the desired protocols. In the example embodiment, repeater 66 is not included to reduce costs and USB is provided as an option to communicate if Thunderbolt reception signal transmission is weak due to operating conditions. Generally, Thunderbolt runs at 20 Gbps compared with 5-10 Gps for USB, DisplayPort, PCIe and similar serial protocols that use differential signaling. In one embodiment, Thunderbolt is sent as differential signals through high speed FETs since single-ended signals may have difficulty at full speeds under Thunderbolt.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to execute instructions to process information;
a memory disposed in the housing and interfaced with the processor, the memory operable to store the information;
a port disposed at the housing and having plural pins configured to connect with a cable inserted in the port, the cable having plural wirelines; and
a communications controller interfaced with the processor and operable to send the information to the port for communication through the pins;
wherein the communications controller selectively configures the port plural pins in a first configuration having differential signaling at plural pairs of the plural pins and a second configuration having each pin of the plural pairs having single-ended signaling.

2. The information handling system of claim 1 further comprising first and second cables configured to insert into the port and couple with the plural pins, the first cable accepting the differential signaling for communication of the information to an external device, the second cable accepting single-ended signals through the plural pins and adding differential signals at wirelines of the cable to send the information through the cable with differential signaling.

3. The information handling system of claim 1 further comprising a port monitor operable to establish the first configuration if a first cable is detected at the port and to establish the second configuration if a second cable is detected at the port.

4. The information handling system of claim 1 wherein the plural pins comprises eight pins configurable in the first configuration as four differential pairs to communicate universal serial bus (USB) signals and in the second configuration as eight single-ended signals to communicate USB signals, each single-ended signal communicated at one of the eight pins.

5. The information handling system of claim 2 wherein the second cable comprises a redriver at a connector that inserts in the port, the redriver generating a differential signal for each of the single-ended signals, the differential signals added to the wirelines.

6. The information handling system of claim 5 wherein the second cable further has an end opposite the connector that inserts in the port, the end having another connector and a redriver generating a differential single for each of plural single-ended signals that insert at the opposite end connector.

7. The information handling system of claim 5 wherein the second cable further has an end opposite the connector that inserts in the port, the end having another connector that provides the differential signals to a port.

8. The information handling system of claim 4 wherein in the second configuration further comprises four single-ended signals to communicate display signals, each single-ended signal communicated at one of the eight pins.

9. A method for information handling system differential signaling, the method comprising:
sending information from a port of the information handling system as plural differential signals, each differential signal sent from a set of first and second port pins;
re-configuring one or more of the sets of first and second pins to send a first single-ended signal at the first port pin and a second single-ended signal at the second port pin; and
adding a differential signal to a cable connected with the port for each single-ended signal provided from the port pins.

10. The method of claim 9 further comprising:
detecting that a cable coupled to the port is capable of adding a differential signal to a single-ended signal; and
in response to detecting, automatically re-configuring the one or more of the sets of the first and second pins.

11. The method of claim 9 further comprising:
sending information with USB protocol through the differential signals; and
sending display information with a display protocol through the single-ended signals.

12. The method of claim 9 wherein four sets of first and second pins sends information as four differential signals and re-configured as eight single-sided signals, each single-sided signal sent to one pin of the four sets of first and second pins.

13. The method of claim 9 further comprising:
receiving at least one of the differential signals at an opposing end of the cable; and
removing the differential signal in the cable to send the information as a single-sided signal to a device coupled to the opposite end of the cable.

14. The method of claim 11 wherein adding a differential signal to a cable connected with a port for each single-ended signal further comprises:
generating the differential signals with a redriver integrated in the cable; and
providing the differential signals to wirelines disposed in the cable and not physically connected to pins of the information handling system port.

15. A communications controller comprising:
a controller operable to process information into a digital signal having high and low values, and to process a digital signal having high and low values into information; and
non-transitory memory interfaced with the controller and storing instructions for the controller that when executed on the controller causes the controller to:
send the information as differential signals at one or more sets of first and second pins, the differential signals having opposing high and low values;
detect a predetermined condition; and
in response to the predetermined condition, send at least some of the information as single-ended signals to each of plural pins individually.

16. The communications controller of claim 15 wherein the predetermined condition comprises coupling of a cable to a port interfaced with the controller, the cable having first and second wirelines for each of the plural pins sent the single-ended signals.

17. The communications controller claim 15 wherein the predetermined condition comprises a redriver disposed in a cable interfaced with the single-ended signals, the redriver operable to apply each single-ended signal as a differential single to first and second wireline disposed in the cable.

18. The communications controller of claim 15 wherein differential signals comprise information formatted to communicate with the USB protocol.

19. The communications controller of claim 15 wherein the single-ended signals comprise pixel information formatted to communication with a display protocol.

20. The communications controller of claim 15 wherein the plural pins comprise USB Type-C port pins.

* * * * *